United States Patent
Kadle et al.

(10) Patent No.: US 6,651,895 B1
(45) Date of Patent: Nov. 25, 2003

(54) ADAPTIVE AUTOMATIC CLIMATE CONTROL METHOD FOR A MOTOR VEHICLE

(75) Inventors: Prasad Shripad Kadle, East Amherst, NY (US); Mingyu Wang, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/222,121

(22) Filed: Aug. 16, 2002

(51) Int. Cl.[7] .............................. F24F 7/00; F24F 11/00
(52) U.S. Cl. ...................... 236/49.3; 454/258; 62/178
(58) Field of Search ............................... 236/49.3, 49.1; 62/178, 180; 165/202, 203, 205; 454/258, 370

(56) References Cited

U.S. PATENT DOCUMENTS

| | | | |
|---|---|---|---|
| 4,460,035 A | * 7/1984 | Mizote et al. ................ 165/12 |
| 5,427,313 A | * 6/1995 | Davis, Jr. et al. ........... 236/49.3 |
| 5,433,266 A | * 7/1995 | Doi et al. ..................... 165/29 |
| 5,511,724 A | * 4/1996 | Freiberger et al. ......... 236/49.3 |
| 5,549,152 A | * 8/1996 | Davis, Jr. et al. ........... 165/201 |
| 5,579,994 A | * 12/1996 | Davis, Jr. et al. .......... 236/49.3 |
| 5,603,226 A | * 2/1997 | Ishikawa et al. .............. 62/182 |
| 5,988,517 A | * 11/1999 | Bauer et al. ................ 236/49.3 |
| 6,173,902 B1 | * 1/2001 | Bauer et al. ................ 236/49.3 |

* cited by examiner

Primary Examiner—Marc Norman
(74) Attorney, Agent, or Firm—Patrick M. Griffin

(57) ABSTRACT

An improved motor vehicle automatic climate control methodology allows an occupant of the vehicle to select one of a number of automatic climate control settings that are calibrated to satisfy the comfort preferences of different types of occupants. In a first embodiment, the occupant selects one of a number of a pre-programmed control setting schedules that provide different HVAC power levels. In a second embodiment, the occupant first selects a desired HVAC power level, and then activates one of a number of control setting combinations that satisfy both the selected HVAC power level and his or her comfort preference.

10 Claims, 3 Drawing Sheets

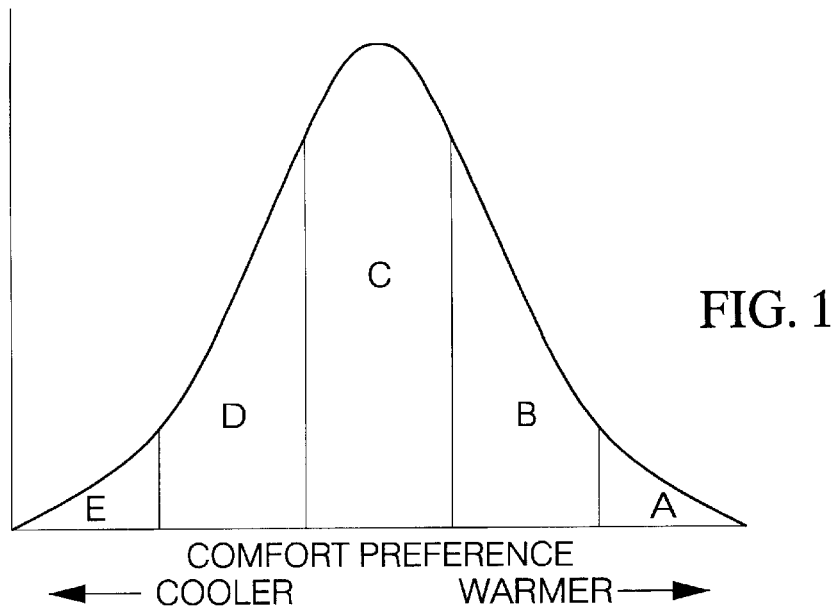
FIG. 1
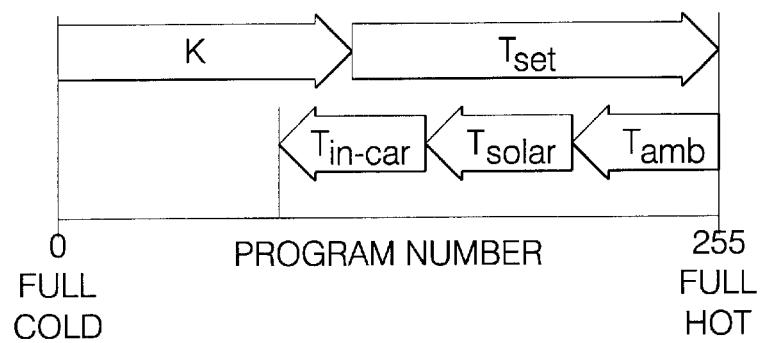
FIG. 2A - PRIOR ART
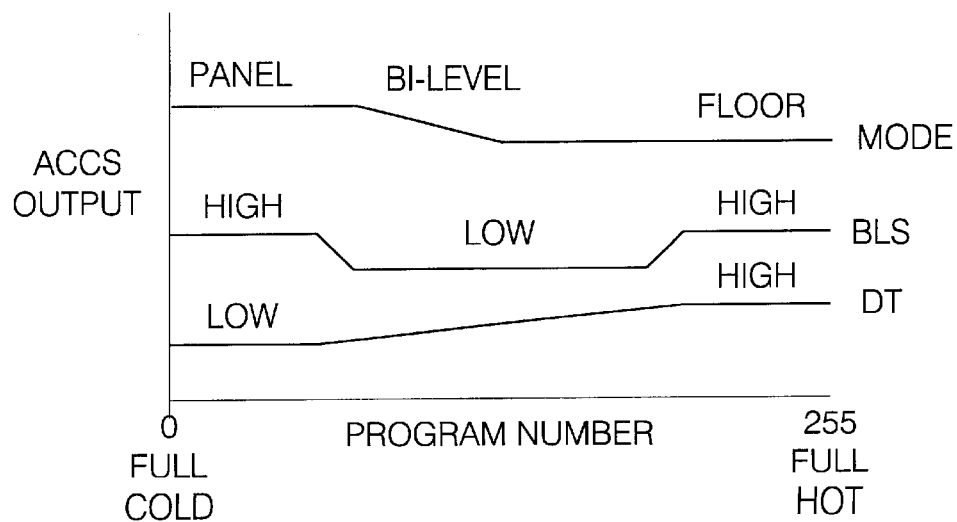
FIG. 2B - PRIOR ART

ADAPTIVE AUTOMATIC CLIMATE CONTROL METHOD FOR A MOTOR VEHICLE

TECHNICAL FIELD

This invention relates to the control of an automatic climate control system (ACCS) for a motor vehicle heating, ventilation and air conditioning (HVAC) apparatus, and more particularly to a method of adapting the automatic climate control to the comfort preferences of different occupants.

BACKGROUND OF THE INVENTION

In vehicles having an HVAC apparatus regulated by an ACCS, the driver adjusts a set temperature (Tset) on an interface panel for selecting the desired cabin temperature. An ACCS control module responds to Tset, the actual cabin temperature and the ambient air temperature (Tamb) in a pre-programmed way to control the blower speed, air discharge temperature and air delivery mode. Typically, the control is calibrated to supply sufficient HVAC power to sustain a nominal set temperature under nominal ambient conditions. Deviations of the set temperature and/or the ambient temperature from the nominal value change the HVAC power level by increasing or decreasing the discharge air temperature, and possibly increasing the blower speed.

Of course, most HVAC power levels may be achieved with a variety of combinations of blower speed and air discharge temperature, and it is up to the calibration engineer to determine what combination of settings the system will provide. Since low blower speed is considered to be desirable for most occupants, the system is usually calibrated to maintain a relatively low blower speed and to respond to minor variations in Tset and/or Tamb by changing the discharge air temperature. However, the comfort preferences of any given occupant may differ from those of the calibration engineer, and such occupants frequently override the preprogrammed settings, for example by manually raising the blower speed to increase the air discharge velocity and/or changing the selected air delivery mode. In effect, the entire spectrum of occupant comfort preferences may be characterized by a standard bell curve distribution, as graphically depicted in FIG. 1. The curve has been arbitrarily divided into five regions designated by the letters A, B, C, D and E, with region C representing the group of occupants that are generally satisfied with the pre-programmed settings provided by a properly calibrated ACCS. The pre-programmed settings are too cool for occupants represented by regions B and A, who tend to raise Tset, to manually lower the blower speed, and to select a more diffuse air delivery mode. Conversely, the pre-programmed settings are not cool enough for occupants represented by regions D and E, who tend to lower Tset, to manually raise the blower speed, and to select a more direct air delivery mode.

While the manual override controls may allow different occupants to obtain the HVAC settings they desire, it would be preferable if the ACCS had the flexibility to satisfy the preferences of different occupants while continuing to operate in the automatic control mode. To this end, various control strategies have been developed for adaptively adjusting the control of an ACCS based on observed manual overriding of the pre-programmed HVAC settings. See, for example, the U.S. Pat. No. 5,511,724 to Freiberger et al., issued on Apr. 30, 1996, and assigned to the assignee of the present invention. However, many occupants may prefer a faster and more direct way of adapting the automatic control settings to their own preferences, particularly in cases where several different occupants use the vehicle. Accordingly, what is needed is an ACCS that allows vehicle occupants to select automatic control settings that more nearly correspond to their comfort preferences.

SUMMARY OF THE INVENTION

The present invention is directed to an improved motor vehicle automatic climate methodology in which an occupant of the vehicle selects one of a number of automatic climate control settings that are calibrated to satisfy the comfort preferences of different types of occupants. In a first embodiment, the occupant selects one of a number of a pre-programmed control setting schedules that provide different HVAC power levels. In a second embodiment, the occupant first selects a desired HVAC power level, and then activates one of a number of control setting combinations that satisfy both the selected HVAC power level and his or her comfort preference.

BRIEF DESCRIPTION OF THE DRAWINGS

The present invention will now be described, by way of example, with reference to the accompanying drawings, in which:

FIG. 1 graphically depicts a distribution of occupants by their comfort preferences.

FIGS. 2A and 2B illustrate a program number control methodology carried out by a prior art motor vehicle automatic climate control system. FIG. 2A illustrates formulation of a Program Number, and FIG. 2B illustrates pre-programmed control settings based on the formulated Program Number.

DESCRIPTION OF THE PREFERRED EMBODIMENT

The present invention is described herein in the context of an ACCS in which the set temperature (Tset), the outside air temperature (Tamb), the cabin air temperature (Tin-car), and a measure of solar loading (Tsolar), with proper scaling, are combined with a constant K to form a Program Number (PN), which in turn, is used to schedule control settings for blower speed (BLS), air discharge temperature (DT) and air delivery mode (MODE). The sum of Tset and the constant K is offset by the sum of Tamb, Tsolar and Tin-car to determine PN, as depicted in FIG. 2A; and the determined value of PN is used to look-up control settings for BLS, DT and MODE, as illustrated in FIG. 2B. The program number PN essentially represents a required HVAC power level for sustaining the desired cabin temperature, and may be determined or calculated differently than described above.

The depicted control settings for BLS, DT and MODE are typical of a conventional ACCS system that is calibrated to satisfy the comfort preferences of the "usual" occupant by maintaining a relatively low blower speed BLS for intermediate values of PN, and responding to minor changes in PN by adjusting the discharge air temperature DT and the air delivery mode MODE to a lesser extent. As indicated above, the depicted control settings will generally satisfy occupants having comfort preferences represented by the region C of FIG. 1, but will not satisfy occupants having comfort preferences represented by the regions A, B, D or E. To some extent, the differences in comfort preference may be explained by the occupant age, gender and body fat ratio, with older occupants tending to fall into regions A and B, and younger occupants tending to fall into regions D and E.

Figure 3:
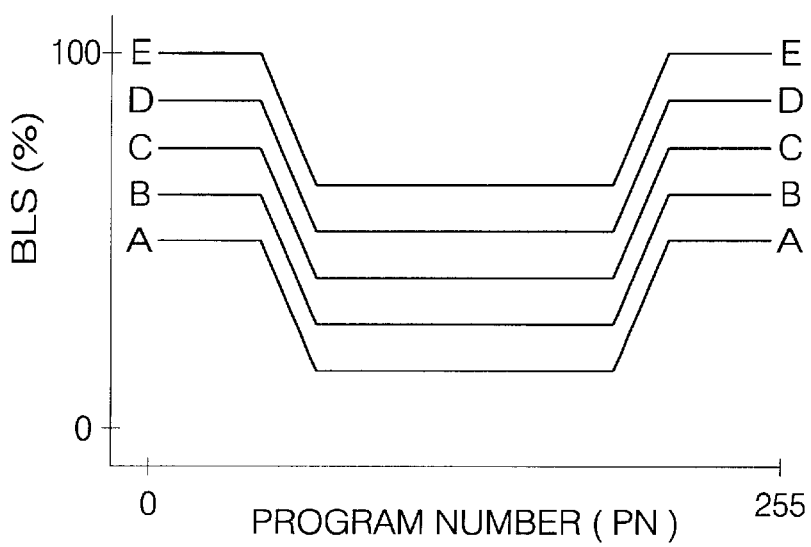
FIG. 3 graphically depicts a set of different blower speed control schedules calibrated to satisfy the comfort preferences of occupants having different comfort preferences.
Figure 4:
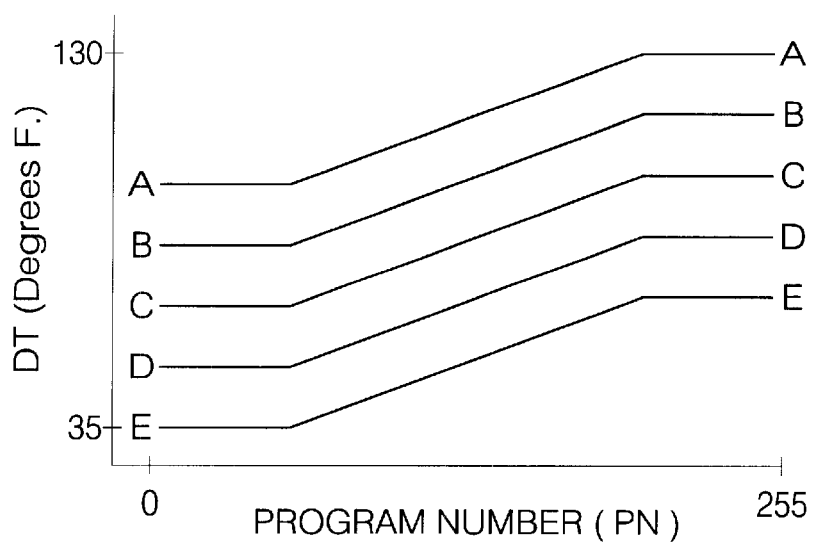
FIG. 4 graphically depicts a set of different air discharge temperature control schedules calibrated to satisfy the comfort preferences of occupants having different comfort preferences.
Figure 5:
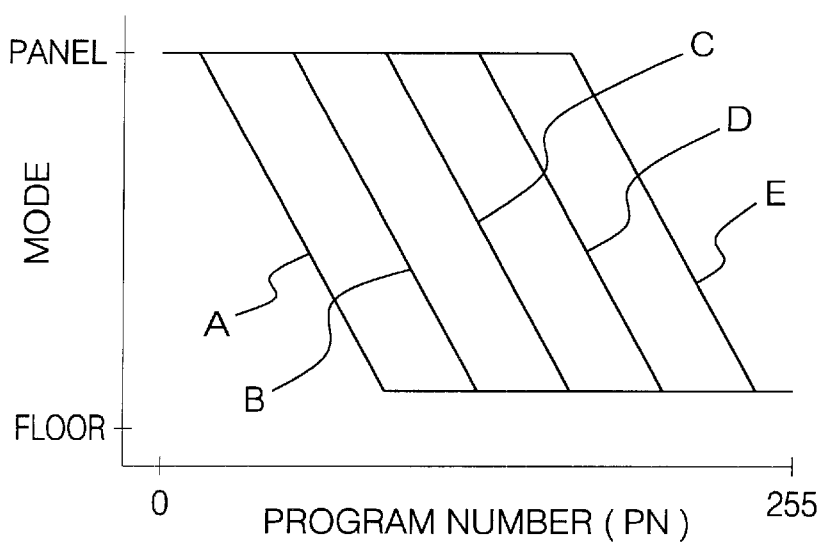
FIG. 5 graphically depicts a set of different air discharge mode control schedules calibrated to satisfy the comfort preferences of occupants having different comfort preferences.

In a broad sense, the present invention addresses the above-described variation in occupant comfort preference by programming the ACCS with several different control setting schedules calibrated to address several different comfort preferences, and allowing an occupant to select a control setting schedule that most nearly satisfies his or her comfort preference. In the illustrated embodiment, for example, the ACCS is configured to allow the occupant to select one of five different control setting schedules that generally correspond to the comfort preference regions A, B, C, D and E of FIG. 1. FIG. 3 graphically depicts the five different control setting schedules for blower speed BLS as a function of program number PN, while FIG. 4 graphically depicts the five different control setting schedules for air discharge temperature DT as a function of PN. Different control setting schedules for the air delivery mode MODE may also be provided, as illustrated in FIG. 5. In each case, the various schedules are identified by the letters A–E, which correspond to the comfort preference regions A–E of FIG. 1. Thus, a nominal value of PN will result in relatively low blower speed and high air discharge temperature with a bias toward a diffuse air delivery mode when setting A is selected, relatively high blower speed and low air discharge temperature with a bias toward a direct air delivery mode when setting E is selected, and progressively increasing and decreasing intermediate values of blower speed and air discharge temperature and progressively more direct air delivery when settings B, C and D are selected. In practice, the setting C will be the default setting, as it is calibrated to satisfy the comfort preferences of the greatest number of occupants.

Figure 6:
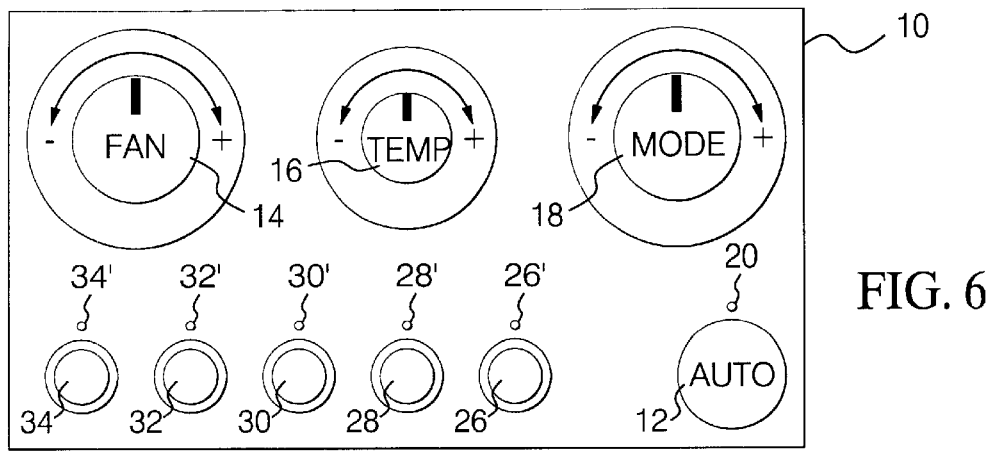
FIGS. 6 and 7 depict alternate ACCS occupant interface panels for carrying out an adaptive control methodology according to a first embodiment of this invention.

FIG. 6 depicts an ACCS interface panel 10 for implementing the above-described control methodology in the context of a single zone system. As with most ACCS interface panels, an Auto button 12 is provided for operator activation of automatic climate control, and the control knobs 14, 16 and 18 are used to manually override the fan, temperature and mode settings of the automatic control. Overriding the automatic control settings effectively deactivates the automatic control, and a lamp 20 above the Auto button 12 indicates the control status. The buttons 26, 28, 30, 32 and 34 respectively correspond to the control schedules A, B, C, D and E of FIGS. 3, 4 and 5, and are momentarily depressed during activation of automatic climate control for occupant selection of a desired control setting schedule. The lamps 26', 28', 30', 32' and 34' above the respective buttons 26, 28, 30, 32 and 34 indicate the selected schedule. The buttons 26–34 may be color-coded or otherwise marked to convey a visible indication of the corresponding control setting schedule. For example, the button 30 may have a neutral color, the buttons 28 and 26 progressively warmer colors, and the buttons 32 and 34 progressively cooler colors. As mentioned above, the control setting schedule C corresponding to button 30 will be the default setting, as it is calibrated to satisfy the comfort preferences of the greatest number of occupants. Accordingly, the lamp 30' is initially illuminated, and thereafter the occupant can select a different control setting schedule by depressing one of the other buttons 26, 28, 32 or 34. Since the different control schedules provide significant differentiation in blower speed and discharge air temperature, only a short period of experimentation is needed to identify the schedule that most nearly satisfies the occupant's comfort preference; thereafter, that occupant will know which control schedule to select without experimentation. Also, it is possible to automatically activate a learned control schedule selection if the occupant is identifiable, in the same way that the vehicle seat and mirror can be automatically positioned for a particular occupant.

Figure 7:
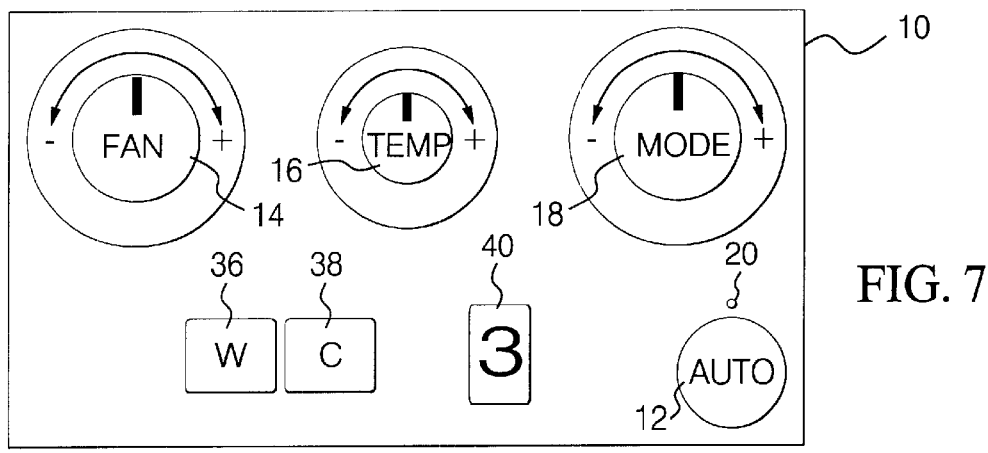

FIG. 7 depicts an alternate mechanization of the interface panel 10 where the buttons 26–34 are replaced by a "warmer" button 36 and a "cooler" button 38, and a display 40 is used to indicate the selected control setting schedule. In this case, the display numeral 3 corresponds to control schedule C, and the buttons 36 or 38 may be depressed one or more times to select a warmer or cooler schedule.

Figure 8:
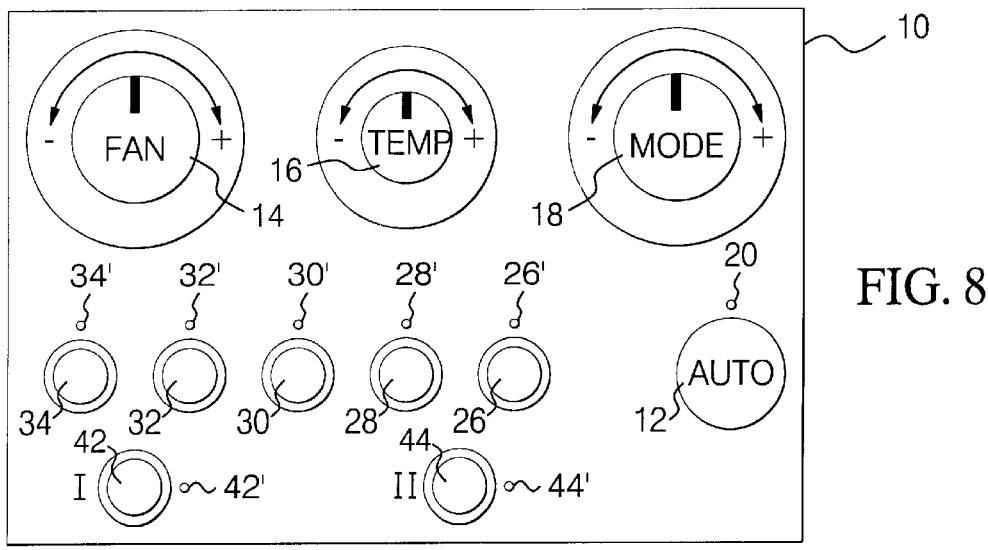
FIG. 8 depicts an ACCS occupant interface panel for carrying out an adaptive control methodology according to a second embodiment of this invention.

A second embodiment of the present invention further enhances the flexibility of the ACCS by enabling the system to provide different combinations of blower speed and air discharge temperature for a given HVAC power level. For example, the five different blower speed schedules of FIG. 3 and the five different air discharge temperature schedules of FIG. 4 may be variously combined to form twenty-five different control schedule possibilities. For example, the blower speed control schedule D may be combined with the air discharge temperature schedule B, and so on. In mechanizing such a control, the various control schedule combinations can be sorted into groups that provide similar HVAC power levels. The occupant of the vehicle first selects a desired HVAC power level, and then selects a particular control schedule combination from the corresponding group. This process may be easily implemented as shown in the interface panel 10 of FIG. 8 by adding a pair of function buttons 42 and 44 to the interface panel mechanization of FIG. 6. Depressing the function button 42 activates a power selection mode in which the buttons 26–34 are used to select the desired HVAC power level, while depressing the function button 44 activates a mixture selection mode in which the buttons 26–34 are used to select a particular combination of blower speed and air discharge temperature corresponding to the selected power level.

In summary, the methodology of this invention enables a vehicle occupant to adapt the control settings of an automatic climate control system according to his or her comfort preference. While this invention has been described in reference to the illustrated embodiments, it is expected that various modifications in addition to those suggested above will occur to those skilled in the art. For example, the control of this invention is not limited to a control based on a program number, and may be applied to systems with multiple zone control. Also, a different number and/or type of control schedule could be used, and so on. Accordingly, it should be understood that the scope of this invention is not limited to the illustrated embodiment, and that controls incorporating such modifications may fall within the intended breadth of the appended claims.

What is claimed is:

1. A method of operation for a system that regulates vehicle cabin air temperature by specifying a discharge temperature of ventilation air and a ventilation blower speed, the method comprising the steps of:

categorizing a distribution of vehicle occupants by comfort preference;

calibrating and storing a set of discharge temperature and blower speed control schedules for each category of vehicle occupants;

selecting an occupant category for a current vehicle occupant, and a set of stored discharge temperature and blower speed control schedules corresponding to the selected occupant category; and specifying the discharge temperature of the ventilation air and the ventilation blower speed in accordance with the selected set of discharge temperature and blower speed control schedules.

2. The method of operation of claim 1, including the steps of:

calibrating and storing an air discharge mode control schedule for each category of vehicle occupants;

selecting an air discharge mode control schedule corresponding to the selected occupant category; and specifying a discharge location of the ventilation air in accordance with the selected air discharge mode control schedule.

3. The method of operation of claim 1, including the steps of:

providing an interface panel for interaction with the current vehicle occupant; and selecting the occupant category for the current vehicle occupant based on manual interaction of the current vehicle occupant with said interface panel.

4. The method of operation of claim 3, wherein the current vehicle occupant manually identifies his or her comfort preference by interaction with said interface panel, and the occupant category for the current vehicle occupant is selected based on the identified comfort preference.

5. The method of operation of claim 3, including the step of:

providing switches on said interface panel for occupant identification of comfort preference.

6. The method of operation of claim 1, including the steps of:

identifying a default set of discharge temperature and blower speed control schedules calibrated for a category of occupants that is considered to be representative of a typical vehicle occupant; and initiating operation of said system by specifying the discharge temperature of the ventilation air and the ventilation blower speed in accordance with the identified default set of discharge temperature and blower speed control schedules.

7. The method of operation of claim 1, including the steps of:

generating multiple sets of discharge temperature and blower speed control schedules;

forming different combinations of said discharge temperature and blower speed control schedules, and associating such combinations with said categories of vehicle occupants;

selecting an occupant category for a current vehicle occupant, and a combination of discharge temperature and blower speed control schedules that is associated with the selected occupant category; and specifying the discharge temperature of the ventilation air and the ventilation blower speed in accordance with the selected combination of discharge temperature and blower speed control schedules.

8. The method of operation of claim 7, including the steps of:

providing an interface panel for interaction with the current vehicle occupant; and selecting the occupant category for the current vehicle occupant based on manual interaction of the current vehicle occupant with said interface panel in a first stage of control adaptation; and selecting the combination of discharge temperature and blower speed control schedules associated with the selected occupant category based on manual interaction of the current vehicle occupant with said interface panel in a second stage of control adaptation.

9. A method of operation for a system that regulates vehicle cabin air temperature by specifying a discharge temperature of ventilation air and a ventilation blower speed, the method comprising the steps of:

categorizing a distribution of vehicle occupants by comfort preference;

calibrating and storing a set of discharge temperature and blower speed control schedules for each category of vehicle occupants; and adapting the system to a current vehicle occupant by:
   selecting an occupant category for the current vehicle occupant, and a set of stored discharge temperature and blower speed control schedules corresponding to the selected occupant category; and specifying the discharge temperature of the ventilation air and the ventilation blower speed in accordance with the selected set of discharge temperature and blower speed control schedules.

10. A method of operation for a system that regulates vehicle cabin air temperature by specifying a discharge temperature of ventilation air and a ventilation blower speed, the method comprising the steps of:

categorizing a distribution of vehicle occupants by comfort preference;

generating multiple sets of discharge temperature and blower speed control schedules;

forming different combinations of said discharge temperature and blower speed control schedules, and associating such combinations with said categories of vehicle occupants; and adapting the system to a current vehicle occupant by:
    selecting an occupant category for the current vehicle occupant, and a combination of discharge temperature and blower speed control schedules that is associated with the selected occupant category; and specifying the discharge temperature of the ventilation air and the ventilation blower speed in accordance with the selected combination of discharge temperature and blower speed control schedules.

* * * * *